Jan. 15, 1946.  E. G. WARD  2,392,892
RETRACTABLE LANDING GEAR
Filed July 18, 1942  2 Sheets-Sheet 1
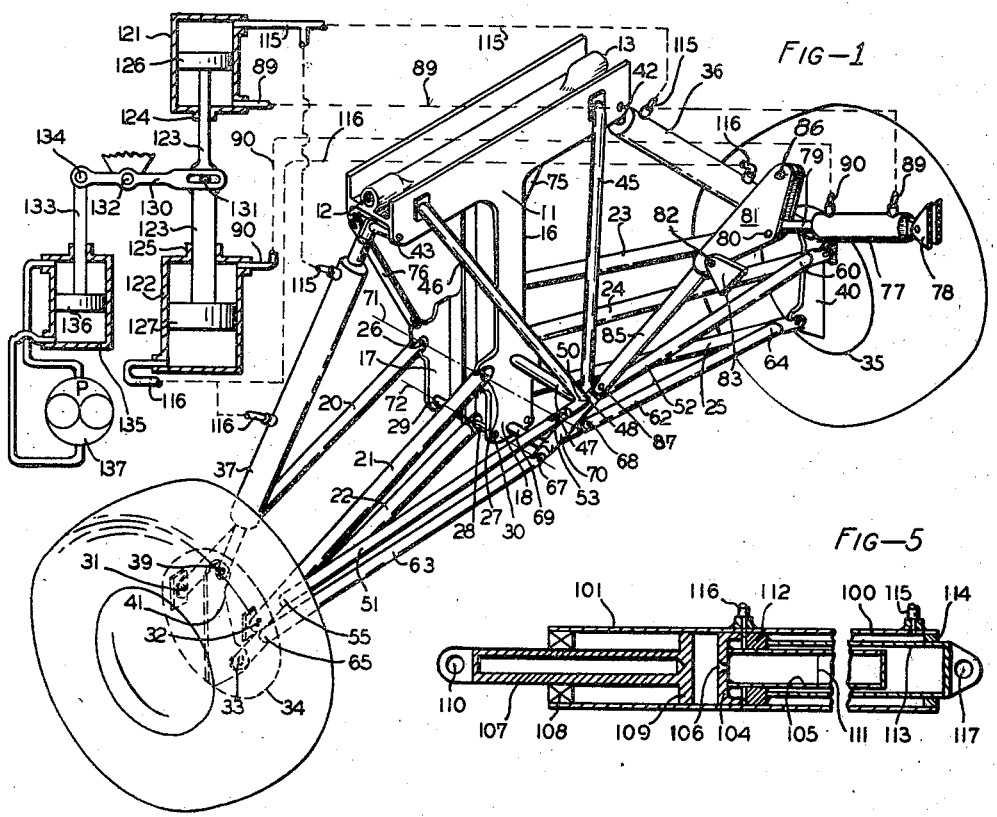
INVENTOR
EDWARD G. WARD

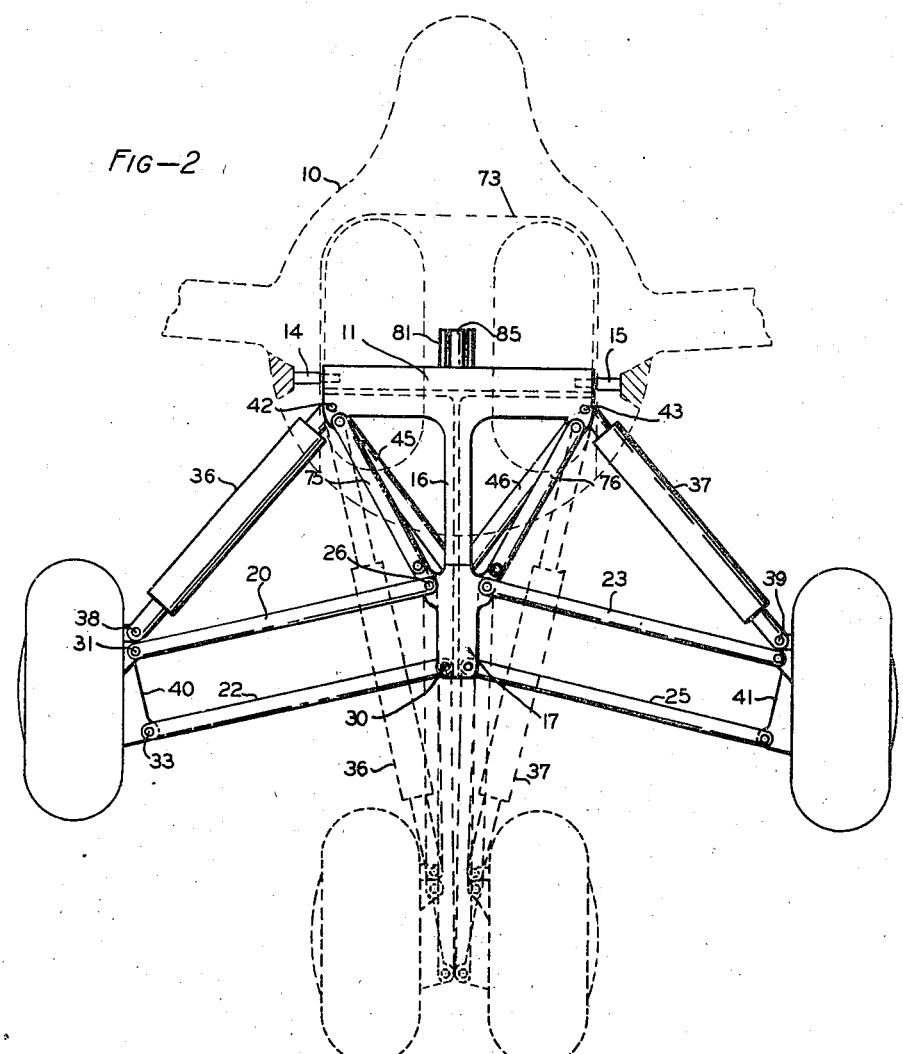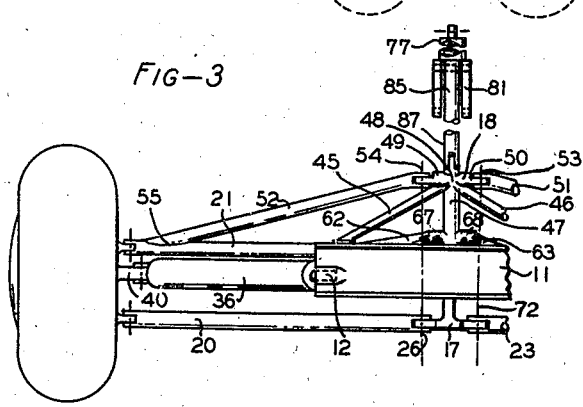

Patented Jan. 15, 1946

2,392,892

UNITED STATES PATENT OFFICE 2,392,892

RETRACTABLE LANDING GEAR

Edward G. Ward, Glendale, Calif., assignor to Lockheed Aircraft Corporation, Burbank, Calif.

Application July 18, 1942, Serial No. 451,475

4 Claims. (Cl. 244—102)

The present invention relates to retractable landing gears for airplanes.

In the conventional type of airplane of current design retractable landing gears of various designs are commonly employed and are well known. In some of the airplanes, principally amphibions, the landing gear is adapted to fold into the sides of the fuselage, but in most cases it is adapted either to swing laterally into submergence in the root portion of the wing in the case of single motored airplanes to form an uninterrupted smooth airfoil surface or to swing longitudinally into suitable recesses provided in engine nacelles in the case of multimotor airplanes.

As airplane speeds become higher, particularly in the compact interceptor and fighter military types of airplanes, aerodynamic considerations dictate a progressive reduction in width and cross-sectional area of the fuselage, and reduction of the thickness of the wings to a degree where it is impossible to provide recesses in the wings of sufficient depth to house a landing gear wheel of adequate size. It is also difficult to find room, particularly in the military type of airplane, for housing the landing gear and wheels in the sides of the fuselage in the manner heretofore employed.

Accordingly, it is an object of the present invention to provide a retractable landing gear of novel construction and adapted to use in airplanes having wing sections which are too thin to house the landing gear wheels.

It is a further object of this invention to provide a landing gear structure adapted to be supported entirely independent of the wings and to retract and be housed entirely within the fuselage.

It is a further object of the present invention to provide a folding landing gear of novel design adapted to be retracted into the bottom surface of a fuselage.

The objects of this invention are accomplished in general by providing a landing gear structure having a pair of laterally extending wheel supporting struts carrying landing wheels whereby a wide supporting tread is formed with means to fold said supports and wheels together and into the bottom portion of the fuselage.

Other objects and features of novelty will be evident hereinafter.

Referring to the drawings wherein a preferred embodiment of the invention is illustrated and wherein the same reference characters refer to similar parts:

Figure 1 is an isometric view of the general construction of the landing gear together with diagrammatic means for its actuation;

Figure 2 is a front elevation of the landing gear structure in a fully extended position as taken on line 2—2 of Figure 4;

Figure 3 is a fragmentary plan view of the landing gear structure as taken on line 3—3 of Figure 2;

Figure 4 is a side elevation of the landing gear structure; and

Figure 5 is an enlarged longitudinal cross-section of a variable length, shock absorbing strut.

The apparatus of the invention is as follows:

Referring primarily to Figure 2, the outline of the cross-section of the fuselage is indicated by dotted lines at 10. The central and primary structural unit of the landing gear to which substantially all of the movable structural elements of the retractable landing gear are pivotally connected, comprises a T shaped metal casting or forging 11, the components of which are essentially I beam shaped in cross-section. The said T unit is pivotally supported by suitable bearings 12 and 13 upon coaxially positioned pivots 14 and 15 which are rigidly attached to the internal components of the fuselage structure.

Adjacent the lower end of the vertical stem portion 16 of the T unit 11 as viewed in Figure 2, are provided with forward and rear gusset connections 17 and 18 adapted to pivotally support on either side a set of three parallel, laterally extending parallelogram links 20, 21 and 22 as shown on the left and 23, 24 and 25 as shown on the right as viewed from the rear as in Figure 2. The parallelogram link rods 20 and 21 are pivotally connected at their inner ends to the upper left portions of the gussets 17 and 18 respectively by suitable pin connections as shown at 26 and 27 and the single lower link rod 22 is pivotally connected at its inner end to the mid-portion of a bearing pin 28 which extends between the lower left portions of the same gussets between points 29 and 30. The opposite parallelogram link rods 23, 24 and 25 are similarly pin connected at their inner ends to the right hand portion of the gussets 17 and 18.

The beforementioned parallelogram link rods 20—22 and 23—25 are pivotally connected at their outer ends as shown at 31, 32 and 33 to suitable pin connectors forming an integral part of the inner faces of the landing wheel drums 34 and 35.

A pair of diagonally positioned hydraulically operated variable length shock absorbing struts 36 and 37 hereinafter more fully described, are pivotally connected at 38 and 39 at their lower ends with webs 40 and 41 forming an integral part of the inner faces of the beforementioned landing wheel drums 34 and 35 and at their upper ends to the outermost ends of the T unit at pin connections intermediate the flanges of the T unit as shown at 42 and 43.

Drag bracing for the landing gear assembly is provided mainly by three struts 45, 46 and 47 attached obliquely to the rear face of the flange of the T unit and extending rearwardly to a common connecting point 48 to form a cabane like structure from the apex of which a pair of laterally directed stub connections 49 and 50 extend. A pair of tubular drag links 51 and 52 are respectively pin connected at 53 and 54 to said stub connections and extend diagonally forward to and make rigid connection with the opposite upper rear parallelogram link rods 21 and 24 at 55 and 60 adjacent their outer ends.

A second pair of diagonally arranged drag links 62 and 63 are attached rigidly at 64 and 65 to the outer portions of the lower parallelogram links 22 and 25 and extend inwardly to a second pair of pin connections 67 and 68 carried on the apex formed by the intersecting connections of a rearwardly extending brace 69 attached to the lower portion of the gusset 18 and a tube bracing element 70 extending diagonally upwardly to the beforementioned cabane like apex 48.

The beforementioned pivotal connections 26, 27 and 53 of the upper left hand parallelogram links and drag struts 20, 21 and 51 are coaxially located upon a common center line as indicated at 71 and pivot points 29 and 67 at the lower parallelogram linkage rod and drag strut are coaxially located upon a common center line or hinge center as indicated at 72 which is parallel with that shown at 71. The center lines of the right hand parallelogram landing gear linkages and drag braces are similarly arranged about common center lines.

A pair of fixed cross bracing struts 75 and 76 are provided to reinforce the vertical stem 16 against lateral bending stresses.

As beforementioned, the whole of the before described landing gear assembly is pivotally supported from within the lower portion of the fuselage structure 10 on suitable pin connections as illustrated at 14 and 15 about which it is adapted to be swung forward through an angle of approximately 90° into substantially a horizontal position into a suitable recess within the fuselage as indicated best at 73 in Figure 4. The said pivotal motion of landing gear assembly is adapted to be effected by means of a hydraulically operated double acting cylinder 77 pivotally connected at the head end to a suitable clevis attachment 78 fixed to the central interior structure of the fuselage. The piston rod 79 of the cylinder 78 makes pivotal connection at 80 to the middle portion of a double faced bell crank 81 adapted to pivot at 82 upon a suitable support 83 also fixed to the fuselage structure. A movable link rod 85 extends between the faces of the bell crank 81 from the upper pivot 86 to a pin connection 87 at the apex 48 of the before described intersecting connection of the bracing rods 45, 46 and 47. In the fully extended position of the landing gear as shown best in Figure 4, the center line of the link 85 extending between centers 86 and 87 falls to the rear of the crank center 82 thus automatically locking the gear against movement other than those caused by impressing fluid pressure upon cylinder 77. Hydraulic pressure may be selectively applied from suitable pressure means to either of the connections 89 or 90 leading to head and piston ends of the cylinder 77. Pressure applied to the head connection 89 will tend to extend the piston rod or plunger 79 and pressure applied at 90 will tend to retract the plunger 79 within the cylinder 77.

Referring now to Figure 5, the construction of each of the extensible hydraulic shock absorber struts is as follows: The shock absorber struts comprise an upper cylindrical portion 100 and a lower cylindrical portion 101 divided at a point about one quarter of its length from the bottom by a fixed diaphragm 104. The diaphragm 104 carries an inner chamber 105 which extends upward and is concentrically positioned within the length of the upper cylindrical portion 100 and an orifice 106 centrally located in the diaphragm 104 forms a restricted passageway between the lower cylinder 101 and the chamber 105. A piston rod or plunger 107 enters the lower end of the cylinder 101 through a suitable guide bushing 108. Said plunger 107 carries a piston 109 at its upper end and an attachment 110 at its lower end adapted to make pivotal connection with the landing wheel drum as shown at 38 and 39 and as hereinbefore described. The space above piston 109 in the cylinder 101 and the lower portion of the chamber 105 is adapted to carry a body of oil which is normally maintained at a level approximately as indicated by the oil level line 111. The balance of the space in the upper end of the chamber 105 is occupied by air under suitable pressure.

An annular shaped piston 112 is reciprocatably contained in the elongated annular space formed between the inner surface of cylinder 100 and the outer surface of the chamber 105 and a tubular plunger 113 connected to said piston 112 extends out of the upper end of said cylinder 100 through a stuffing box 114. Fluid pressure inlets 115 and 116 for actuating the piston 112 are provided entering the head and piston ends respectively of said cylinder 100. The top end of said tubular plunger 113 is provided with a bearing connection 117 by which it is adapted to make pivotal connection with the T unit of the landing gear structure at either 42 or 43 as hereinbefore mentioned.

Referring again to Figure 1, a pair of cylinders 121 and 122 are arranged in tandem with a common reciprocatable piston rod or plunger 123 passing from one cylinder to the other through adjacent stuffing boxes 124 and 125. The said piston rod 123 carries pistons 126 and 127 on opposite ends thereof within the respective cylinders and the diameters of the piston rods with respect to the diameters of their pistons is such as to result in the fluid displacement on either side of the pistons in each cylinder being substantially different and in the ratio of the fluid displacements required to actuate the two extensible shock absorber strut cylinders 100 and the landing gear folding actuating cylinder 77 for their full working strokes.

The pipe connections 89 and 90 from the inner piston rod ends of the cylinders 121 and 122 make connection with the connections of corresponding numbers of landing gear actuating cylinder 77, and pipe connections 115 and 116 make parallel connection with the connections of corresponding reference numbers of the two shock absorber strut actuating cylinders, all as indicated by dotted lines carrying the same reference numerals.

The plunger 123 is actuated by means of a lever 130, one end of which is pivotally connected at 131 to the mid-point of the plunger 123 intermediate the stuffing boxes 124 and 125 of the two cylinders. The lever 130 which is centrally pivoted upon a fixed bearing at 132 is driven by means of a piston rod 133 which is in turn pivotally connected at the outer end 134 to the opposite end of the lever 130. The driving piston rod 133 extends into a cylinder 135 to a piston 136 which is adapted to be reciprocated within the cylinder 135 by means of differential fluid pressure applied across the said piston by means of a reversible gear pump 137 which may in turn be driven in either direction as desired through suitable gearing by the airplane power plant.

The operation of the landing gear apparatus is as follows: Assuming the landing gear to be initially in a fully extended landing position, as shown in solid lines in the drawings, the retraction of the landing gear following take-off is initiated by first relieving the fluid pressure previously maintained on top of the annular piston 112 in the cylinder 100 in the annular space between the plunger 113 and the cylinder 100 and discharging fluid therefrom through the connection 116 through suitable flexible pipe connections, to a fluid reservoir while at the same time fluid pressure is applied from a suitable source such as from an engine driven pump through suitable flexible tubing, and through connection 115 and to the bottom of the said annular piston 112. The differential fluid pressure thus applied on the piston 112 forces it upward in the cylinder 100 resulting in an extension of the plunger 113 and thus effecting an overall increase of the effective length of the shock absorbing strut. This increase in length of the shock absorbing strut allows the parallelogram linkages 20—22 and 23—25 to swing downward about their inner pivot points carrying the landing gear wheel drums downward in parallel motion with respect to one another to the lowered position as indicated in dotted lines in Figure 2, at which point the wheel drums 34 and 35 are brought together back to back.

Following this the whole landing gear assembly, including the T unit structure 11, is next swung forward about the pivots 14 and 15 to the position within the fuselage shown in dotted lines in Figure 4, the two adjacent landing wheels being then completely housed within the beforementioned recess indicated at 73 in Figures 2 and 4. The forward swinging of the landing gear assembly is effected by applying fluid pressure through suitable flexible piping to the head or pivoted end of cylinder 77 through connection 89 to force the piston 79 outward against the pivot 80 in the bell crank 81. Forward rotation of the crank 81 is thus induced about fixed pivot 82 as a center, thus unlocking the linkage and bringing the opposite pivot 86 which carries the upper end of the link 85 forward in an arc as indicated at 84 to a position as indicated in dotted lines in Figure 4. At this location the center-line and thrust line of the link 85 passes below the fixed crank pivot point 82 and at the same time piston 79 comes into contact with the said pivot 82 thus locking the linkage and the landing gear against further movement in either direction. The thrust thus applied to the said link 85 acting upon the pivot 87 swings the landing gear assembly forward and up into a locked position within the fuselage as before described.

To lower the landing gear from the fully retracted position fluid pressure is applied through connection 90 to the piston rod end of the cylinder 77 with the result that tension is applied to the piston rod 79 of sufficient magnitude to raise the crank 81 from the locked position as shown in dotted line in Figure 4 and to rotate said crank back counter-clockwise about the fixed center 82 to the position shown in solid lines in Figures 1 and 4. In this position the center line of the link 85 passes beyond the center of pivot 82 as shown in Figure 4 and thus locks the landing gear in the forward position against further swinging action about pivots 14 and 15. Following this fluid pressure may then be applied through connection 115 to the top of the annular piston 112 while at the same time exhausting the fluid from the lower side through connection 116 to cause the piston rod or plunger 113 to retract within the cylinder 100 thus shortening the effective length of the strut and thereby at the same time swinging the landing wheel upward into the positions best shown in Figures 1 and 2.

Instead of performing the folding operations in two separate successive steps as hereinbefore described, the two steps may be performed simultaneously or in overlapping sequence as desired. In general, it is desirable to perform the two folding steps in overlapping sequence whereby the landing wheels will not be allowed to lower fully to the folded-together position as shown in dotted lines in Figure 2 but instead to commence the forward swing of the landing gear assembly as a whole about pivots 14 and 15 prior to the wheels reaching this fully lowered position, and thus the wheels can be caused to follow a median path of movement into the fuselage recess approximately as indicated by the wheel center line travel shown in dotted line at 120 in Figure 4.

Overlapping or substantially simultaneous performance of the two folding steps may be impelled by the hereinbefore described diagrammatic apparatus of Figure 1 as follows: As the plunger 123 is moved downward as viewed in Figure 1 by means of cylinder 135 acting through lever 130, the fluid in the outer head end of cylinder 127 is displaced through connections 116 into the lower end of the cylinders 100 of the shock struts causing the extension of the plunger 113 while at the same time the fluid displaced from above the annular piston 112 in cylinder 100 is displaced into the outer head end of the cylinder 121 through connection 115. Simultaneously the fluid is displaced from the inner end of cylinder 121 and through connection 89 to the head end of the gear folding cylinder 77 to extend plunger 79 while the fluid thereby displaced from the plunger end of cylinder 77 returns through connection 90 to the inner end of cylinder 122.

By arranging for a suitable amount of lost motion between the pistons of the cylinders adapted to apply fluid pressure to the landing gear actuating mechanism, the sequence of operations in retracting the landing gear within the fuselage can be made successive or overlapping in any described degree.

The foregoing is merely illustrative of a preferred embodiment of the invention and is not to be limited thereby but may include any apparatus which accomplishes the same within the scope of the claims.

I claim:

1. A retractable landing gear for aircraft comprising in combination a fuselage, a primary supporting structure for said landing gear pivotally supported at its upper end in said fuselage upon a laterally positioned axis, said primary structure having a central member arranged to extend downward a substantial distance below said fuselage, a pair of oppositely directed laterally extending parallelogram linkages pivotally attached at their inner ends to the lower end of said central member of the primary supporting structure, wheels rotatably mounted at the outer ends of said linkages, said downwardly extending central member normally occupying a position between said wheels, a variable length shock absorbing strut diagonally positioned between the outer end of said linkages and the upper portion of said primary supporting structure to swing said linkages through arcs in lateral planes with respect to the pivotal attachments to said primary structure whereby the said wheels may be moved closely together in parallel motion with respect to one another, and means to swing said primary supporting structure together with said wheels as a unit through an arc in a longitudinal plane about said lateral axis to a substantially horizontal position within the bottom of said fuselage.

2. A retractable landing gear for aircraft comprising in combination a fuselage, a primary supporting structure for said landing gear pivotally supported at its upper end in said fuselage upon a laterally positioned axis, said primary structure having a central member arranged to extend downward a substantial distance below said fuselage, a pair of oppositely directed laterally extending parallelogram linkages, each linkage comprising three parallel links pivotally connected at their inner ends to the lower end of the primary supporting structure and pivotally attached at their outer ends to a landing wheel supporting drum, wheels rotatably mounted at the outer ends of said linkages, said downwardly extending central member normally occupying a position between said wheels, a variable length shock absorbing strut diagonally positioned between the landing wheel supporting drum and the upper portion of said primary supporting structure to swing said linkages through arcs in lateral planes with respect to the said pivotal attachments to said primary structure whereby the said wheels may be moved closely together in parallel motion with respect to one another, and means to swing said primary supporting structure together with said wheels as a unit through an arc in a longitudinal plane about said lateral axis to a substantially horizontal position within the bottom of said fuselage.

3. A retractable landing gear for aircraft comprising in combination a fuselage, a primary supporting structure for said landing gear pivotally supported at its upper end in said fuselage upon a laterally positioned axis, said primary structure having a central member arranged to extend downward a substantial distance below said fuselage, a pair of oppositely directed laterally extending parallelogram linkages pivotally attached at their inner ends to the lower end of said central member of the primary supporting structure, wheels rotatably mounted at the outer ends of said linkages, the attachment points of said linkages on the central member of the primary supporting structure being substantially aligned in a horizontal plane with the center of said wheels when in the fully extended position, means independent of said linkages adapted to swing the linkages and wheels through arcs in lateral planes with respect to the said pivotal attachments to said primary structure whereby the said wheels may be moved closely together in parallel motion with respect to one another, and other means adapted to swing said primary supporting structure together with said wheels as a unit through an arc in a longitudinal plane about said lateral axis to a substantially horizontal position within the bottom of said fuselage.

4. A retractable landing gear for aircraft comprising in combination a fuselage, a primary supporting structure for said landing gear pivotally supported at its upper end in said fuselage upon a laterally positioned axis, said primary structure having a central member arranged to extend downward a substantial distance below said fuselage, a pair of laterally spaced landing gear wheels movably carried on the lower end of said central member of the primary supporting structure, means positioned between said primary structure and said wheels to move said spaced wheels inward to positions closely adjacent to one another and other means to swing said primary supporting structure together with said wheels through an arc in a longitudinal plane about said lateral axis to a substantially horizontal position within the bottom of said fuselage.

EDWARD G. WARD.